Dec. 20, 1960 H. L. PELTON 2,965,324

TAPE TRANSPORT MECHANISM FOR TAPE RECORDERS

Filed April 20, 1959 2 Sheets-Sheet 1

INVENTOR.
HARRY L. PELTON
BY
Knox & Knox

Dec. 20, 1960 H. L. PELTON 2,965,324

TAPE TRANSPORT MECHANISM FOR TAPE RECORDERS

Filed April 20, 1959 2 Sheets-Sheet 2

INVENTOR.
HARRY L. PELTON
BY Knox & Knox

United States Patent Office 2,965,324

Patented Dec. 20, 1960

2,965,324

TAPE TRANSPORT MECHANISM FOR TAPE RECORDERS

Harry L. Pelton, National City, Calif.
(14436 Kennebunk St., Poway, Calif.)

Filed Apr. 20, 1959, Ser. No. 807,472

8 Claims. (Cl. 242—55.12)

The present invention relates generally to magnetic tape recorders and more particularly to a tape transport mechanism for tape recorders.

The primary object of this invention is to provide a tape transport mechanism having a friction type drive means which is easily shiftable to change the speed of tape travel in either direction, so that tapes may be recorded and played back at any of the accepted standard speeds.

Another object of this invention is to provide a tape transport mechanism in which each tape reel is driven by a separate friction wheel engaged by a powered driving disc in such a manner that only one reel can be driven at a time, thus avoiding tape breakage.

Still another object of this invention is to provide a tape transport mechanism having an automatic brake incorporated in the drive control to prevent over-running of the reels when the driving connection is released.

Another object of this invention is to provide a tape transport mechanism which is simple and economical to manufacture and contains a minimum of moving parts.

A further object of this invention is to provide a tape transport mechanism which is suitable for installation in horizontal or vertical positions.

Finally, it is an object of this invention to provide a tape transport mechanism of the aforementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 1:
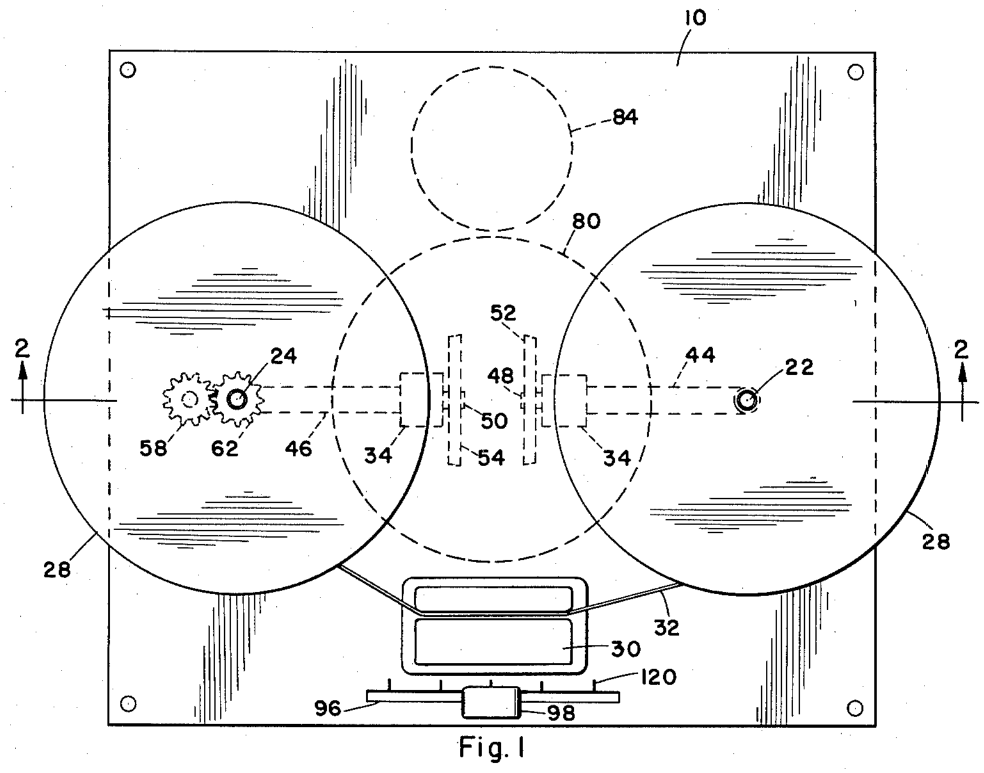
Figure 1 is a top plan view of the mechanism.

The mechanism is mounted on a top panel 10 having a front plate 12 and a back plate 14 fixed to and extending downwardly from the front and rear edges thereof. The lower edges of the front and back plates 12 and 14 have inwardly turned flanges 16 to which is secured a bottom plate 18, held in place by suitable screws 20. In the top panel 10 are two upwardly extending spindles 22 and 24, freely rotatably mounted in bearings 26, said spindles being spaced to carry conventional tape reels 28 with ample clearance. Between the spindles 22 and 24 and adjacent the front edge of the top panel 10 is a recording head 30 containing the recording, play-back and erase units, the tape 32 being passed through the recording head from one reel to the other. This arrangement is well known and may be varied considerably, the specific details thereof not being a part of the present invention.

Fixed to and extending downwardly from the underside of the top panel 10 are two spaced posts 34 each having a longitudinal internal bore 36 and a closed lower end 38, while inside each bore 36 is a slidable support block 40, biased downwardly by a spring 42. The closed lower ends 38 act as stops to limit the downward travel of the support blocks 40. The support blocks 40 hold the ends of flexible shafts 44 and 46, said flexible shafts extending through vertical slots 47 in the posts 34 and passing through the support blocks and having axially opposed ends 48 and 50 on which are mounted drive wheels 52 and 54. Each of the drive wheels 52 and 54 has a frictional rim 56 of rubber or the like. The flexible shaft 44 is connected directly to the spindle 22, while the flexible shaft 46 is connected to a pinion gear 58 mounted on a bearing 60 on the top panel 10, said gear meshing with a second pinion gear 62 fixed on the spindle 24. Thus the spindle 22 is driven directly from the drive wheel 52 and the spindle 24 is driven by the drive wheel 54 but in opposite rotation thereto.

Figure 2:
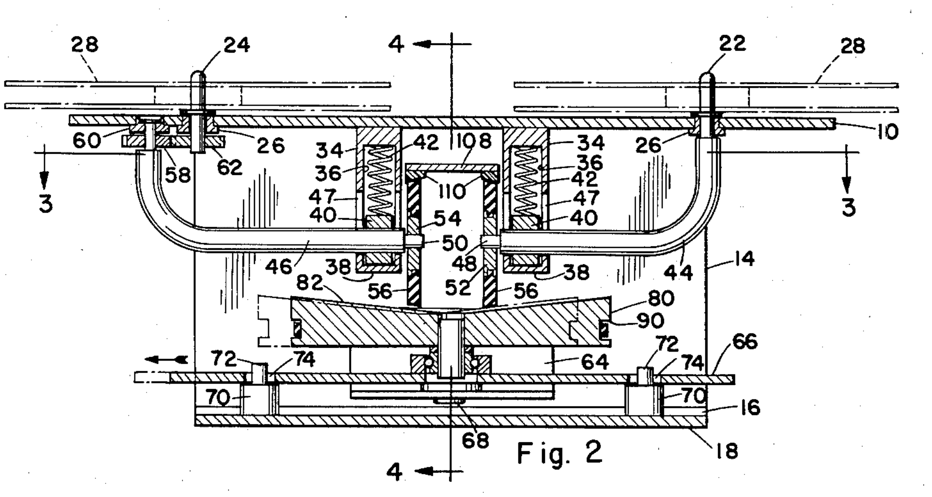
Figure 2 is a sectional view taken on the line 2—2 of Figure 1, certain parts being shown in full for clarity and the motor being omitted.
Figures 3, 4, 5:
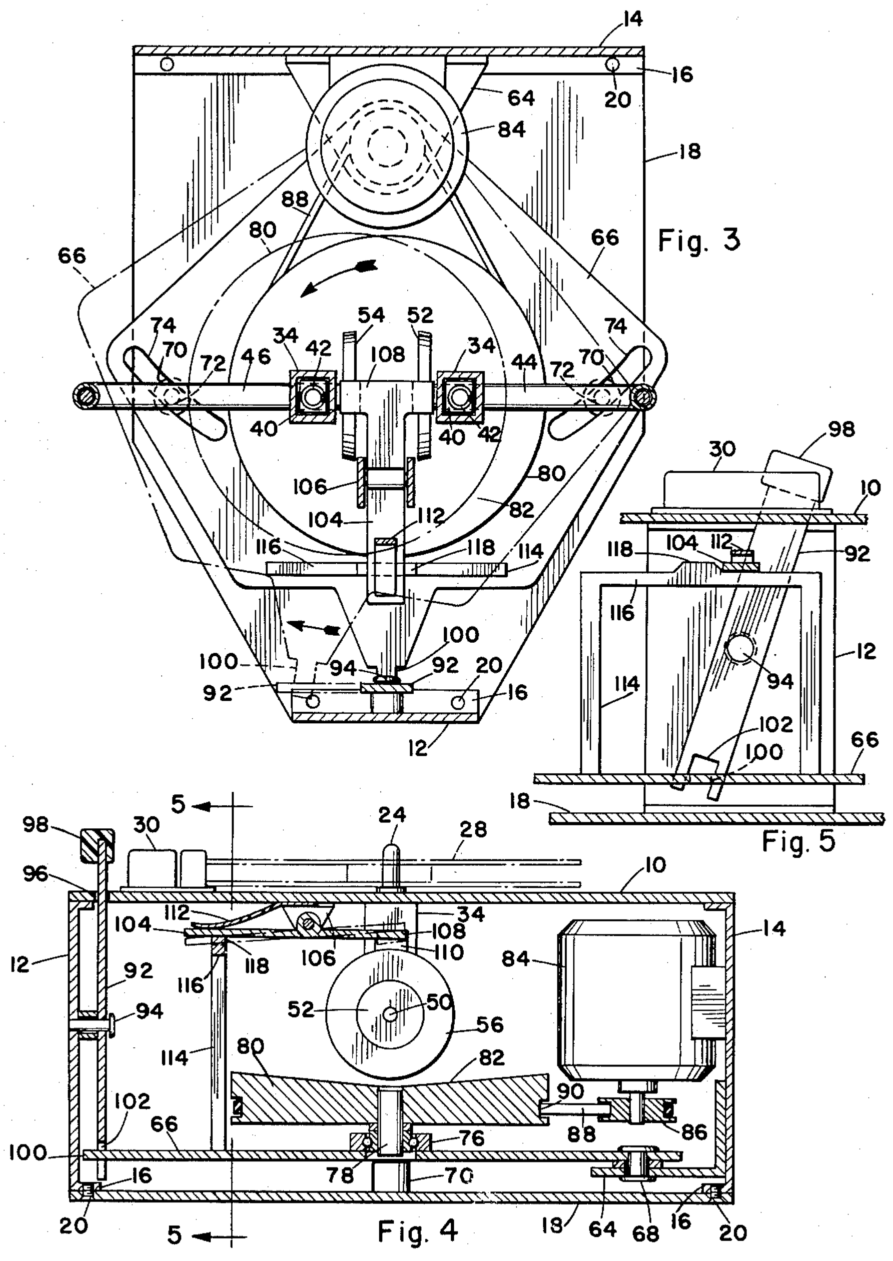
Figure 3 is a sectional view taken on the line 3—3 of Figure 2.
Figure 4 is a sectional view taken on the line 4—4 of Figure 2.
Figure 5 is a sectional view taken on the line 5—5 of Figure 4, but showing the mechanism offset in one driving position.

Fixed to the back plate 14 is a rigid bracket 64 extending horizontally forwardly and attached to said bracket is a shiftable support or mounting plate 66, pivotally held by a pin 68 to swing in a generally horizontal plane. The mounting plate 66 is supported by a pair of spaced pillars 70 having upwardly projecting guide pins 72, which extend through elongated arcuate slots 74 in the mounting plate, said slots having their center of radius at the pin 68. The pillars 70 are fixed to the bottom plate 18 and provide stable support for the mounting plate 66. Fixed on the mounting plate 66 is a bearing 76 in which is an upright shaft 78, said shaft carrying at its upper end a heavy, large diameter driving disc 80 which is rotatable in a horizontal plane. The driving disc 80 has a shallow, conical upper face 82 and is positioned so that the conical face is spaced slightly below and clear of both drive wheels 52 and 54 when the axis of shaft 78 is centered between the wheels, as shown in Figure 2 in full line, the closed ends 38 of the posts 34 holding the drive wheels back to provide the necessary clearance. This is the neutral or no drive position of the mechanism. For proper operation, the axis of shaft 78 is in a vertical plane through the axes of the drive wheels 52 and 54, as in Figure 4.

Secured to the back plate 14 is an electric motor 84 having a drive pulley 86 rotatable on a vertical axis and connected to the driving disc 80 by a belt 88, which rides in a peripheral groove 90 in said driving disc. The axis of pulley 86 is coaxial with the pin 68, so that the belt tension remains unchanged when the mounting plate 66 swings about said pin. The motor 84 is geared or otherwise controlled to a suitable speed necessary to rotate the tape reels 28 at the recognized standard speeds, the actual rotational speed of the motor depending on the relative sizes of the pulley 86, driving disc 80 and drive wheels 52 and 54.

The mounting plate 66 is moved by a shift lever 92 pivotally attached to the front plate 12 by a hinge pin 94, said lever extending upwardly through a slot 96 in the top panel 10 and having a suitable knob 98 fixed thereto. The mounting plate 66 has a forwardly extending arm 100, the lower end of the shift lever 92 having a notched portion 102 which straddles said arm.

To prevent freewheeling or over-running of the tape reels 28 when not actually being driven, the drive wheels 52 and 54 are provided with a brake means. The brake includes a rocker arm 104 pivotally suspended from a bracket 106 fixed to the underside of the top panel 10, said rocker arm tilting about an axis generally parallel to the axes of drive wheels 52 and 54. At one end of the rocker arm 104 is a cross bar 108 having a brake pad 110 fixed to each end thereof, the brake pads being positioned to rest on top of the drive wheels 52 and 54, as in Figures 2 and 4. The other end of the rocker arm 104 is engaged by a leaf spring 112 held in place by the bracket 106, said spring biasing the rocker arm to hold the brake pads 110 clear of the drive wheels. Fixed to the mounting plate 66 is an upright frame 114 having a horizontal rest bar 116 which supports the end of the rocker arm 104 and limits the motion thereof by the spring 112. At the center of the rest bar 116 is a raised cam portion 118 which, when disposed under the rocker arm 104, as in Figure 3 and in full line in Figure 4, tilts the rocker arm to hold the brake pads 110 firmly on the drive wheels 52 and 54.

In the neutral or idling position, the mounting plate 66 is centrally located, with both drive wheels 52 and 54 clear of the driving disc 80 and the rocker arm 104 supported on the cam portion 118 to apply the brake pads 110 to the drive wheels. Thus, even with the motor 84 in operation and turning the driving disc 80, the tape reels 28 are held stationary. To advance the tape in a particular direction, the shift lever 92 is moved in that direction to an offset position, as in Figure 5. This action swings the mounting plate 66 to one side, as indicated in broken line in Figures 2 and 3, and brings the conical face 82 of the driving disc 80 into contact with the drive wheel 52. At the same time, the cam portion 118 moves to one side, allowing the rocker arm 104 to drop and release the brake pads 110 from the drive wheels. The drive wheel 52, now in rolling contact with the driving disc 80, rotates the spindle 22 and advances the tape. The tape speed is regulated by the radial distance from the shaft 78 of the contact point of drive wheel 52 on the conical face 82. The greater the lateral shift of the driving disc 80, the higher the tape speed and suitable indicating marks 120 may be placed on the top panel 10 adjacent the slot 96 to guide the positioning of the shift lever 92 for predetermined speeds. The more common tape speeds are 3¾ inches per second and 7½ inches per second, or multiples or fractions of these speeds. By suitable proportioning of the driving disc 80 and the drive wheels 52 and 54, a wide range of speeds can be obtained, including extra fast wind and rewind speeds. As an alternative for fast rewind speeds, a dual speed motor may be used with suitable switch means for its operation, the particular arrangement being a matter of choice. The spring mounting of the drive wheels in the posts 34 allows adjustment of the wheels to the conical face 82 and ensures proper frictional contact in all driving positions. Due to the conical configuration of the face 82, only one drive wheel can be engaged at one time, so preventing possible tape breakage, since the wheel not in driving engagement is freewheeling. Also, the arrangement of the brake means with both pads 110 on a common cross bar 108, ensures that both reels are stopped simultaneously, again preventing tape breakage.

The tape transport mechanism can be used with various types of electronic sound reproduction equipment and any suitable arrangement of controls may be used, the present invention being concerned only with means for driving the tape. The mechanism contains a minimum of parts and is easily accessible for servicing. Since all moving parts are securely mounted, the mechanism may be used in horizontal or vertical positions without affecting its operation.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A tape transport mechanism, comprising: a frame; a pair of spaced spindles rotatably mounted on said frame for rotation about fixed, spaced, parallel axes and adapted to carry tape containing reels; a pair of spaced, coaxial drive wheels mounted on said frame for rotation about a single axis and individually connected to said spindles; a driving disc rotatably mounted on a shiftable support adjacent said drive wheels; a motor connected to rotate said driving disc; and shift means connected to said driving disc to move said shiftable support and disc into frictional driving engagement with each of said drive wheels selectively.

2. A tape transport mechanism, comprising: a frame; a pair of spaced spindles rotatably mounted on said frame and adapted to carry tape containing reels; a pair of spaced, coaxial drive wheels mounted on said frame and individually connected to said spindles; a driving disc mounted on a shiftable support adjacent said drive wheels and rotatable on an axis substantially normal to the axis of the wheels; a motor connected to rotate said driving disc; said driving disc having a generally conical face adjacent said drive wheels and being positioned so that said conical face is spaced from said drive wheels when the axis of the driving disc is disposed between the drive wheels; and shift means connected to said shiftable support to move the driving disc in a plane substantially parallel to the axis of said drive wheels and bring portions of said conical face into frictional contact with either of the drive wheels selectively.

3. A tape transport mechanism, comprising: a frame; a pair of spaced spindles rotatably mounted on said frame and adapted to carry tape containing reels; a pair of spaced, coaxial drive wheels mounted on said frame and individually connected to said spindles; a driving disc mounted adjacent said drive wheels and rotatable on an axis substantially normal to the axis of the wheels; a motor connected to rotate said driving disc; said driving disc having a generally conical face adjacent said drive wheels and being positioned so that said conical face is spaced from said drive wheels when the axis of the driving disc is disposed in a neutral position between the drive wheels; and shift means connected to said driving disc to move the driving disc in a plane substantially parallel to the axis of said drive wheels and bring portions of said conical face into frictional contact with either of the drive wheels selectively; said drive wheels being biased to maintain selective frictional contact with said conical face when said driving disc is not in said neutral position.

4. A tape transport mechanism, comprising: a frame; a pair of spaced spindles rotatably mounted on said frame and adapted to carry tape containing reels; a pair of spaced, coaxial drive wheels mounted on said frame and individually connected to said spindles; a mounting plate pivotally attached to said frame to swing in a plane substantially parallel to the axis of said drive wheels; a driving disc secured on said mounting plate and rotatable about an axis normal to the plane of the plate; a motor connected to rotate said driving disc; said driving disc having a generally conical face adjacent said drive wheels and being positioned so that said conical face is spaced from the drive wheels when the axis of the driving disc is disposed between the drive wheels; and shift means operatively connected to said mounting plate to move said driving disc and bring portions of said conical face into frictional contact with either of said drive wheels selectively.

5. A tape transport mechanism, comprising: a frame; a pair of spaced spindles rotatably mounted on said frame and adapted to carry tape containing reels; a pair of spaced, coaxial drive wheels mounted on said frame and individually connected to said spindles; a mounting plate pivotally attached to said frame to swing in a plane substantially parallel to the axis of said drive wheels; a driving disc secured on said mounting plate and rotatable about an axis normal to the plane of the plate; a motor connected to rotate said driving disc; said driving disc having a generally conical face adjacent said drive wheels and being positioned so that said conical face is spaced from the drive wheels when the axis of the driving disc is disposed between the drive wheels; shift means operatively connected to said mounting plate to move said driving disc and bring portions of said conical face into frictional contact with either of said drive wheels selectively; said drive wheels being biased toward the driving disc; and stop means engaging said drive wheels to limit their movement toward said driving disc.

6. A tape transport mechanism according to claim 5 and wherein said drive wheels are connected to said spindles by flexible cables; one of said flexible cables having gear means connected thereto to reverse the rotation of one spindle relative to the other.

7. A tape transport mechanism, comprising: a frame; a pair of spaced spindles rotatably mounted on said frame and adapted to carry tape containing reels; a pair of spaced, coaxial drive wheels mounted on said frame and individually connected to said spindles; a mounting plate pivotally attached to said frame to swing in a plane substantially parallel to the axis of said drive wheels; a driving disc secured on said mounting plate and rotatable about an axis normal to the plane of the plate; a motor connected to rotate said driving disc; said driving disc having a generally conical face adjacent said drive wheels and being positioned so that said conical face is spaced from the drive wheels when the axis of the driving disc is disposed between the drive wheels; shift means operatively connected to said mounting plate to move said driving disc and bring portions of said conical face into frictional contact with either of said drive wheels selectively; and brake means engageable with said drive wheels; said brake means being operative with said shift means to engage and lock said drive wheels when said driving disc is disengaged from the drive wheels.

8. A tape transport mechanism, comprising: a frame; a pair of spaced spindles rotatably mounted on said frame and adapted to carry tape containing reels; a pair of spaced, coaxial drive wheels mounted on said frame and individually connected to said spindles; a mounting plate pivotally attached to said frame to swing in a plane substantially parallel to the axis of said drive wheels; a driving disc secured on said mounting plate and rotatable about an axis normal to the plane of the plate; a motor connected to rotate said driving disc; said driving disc having a generally conical face adjacent said drive wheels and being positioned so that said conical face is spaced from the drive wheels when the axis of the driving disc is disposed between the drive wheels; shift means operatively connected to said mounting plate to move said driving disc and bring portions of said conical face into frictional contact with either of said drive wheels selectively; said drive wheels being biased toward the driving disc; stop means engaging said drive wheels to limit their movement toward said driving disc; an arm member pivotally attached to said frame and having frictional brake pads thereon engageable with said drive wheels; said arm being biased to hold said brake pads normally clear of said drive wheels; and cam means secured to said mounting plate to engage said arm and force said brake pads into contact with said drive wheels when said driving disc is disengaged from the drive wheels.

References Cited in the file of this patent

UNITED STATES PATENTS

| | | |
|---|---|---|
| 1,412,529 | Joslin | Apr. 11, 1922 |
| 2,813,686 | Schroter | Nov. 19, 1957 |